UNITED STATES PATENT OFFICE.

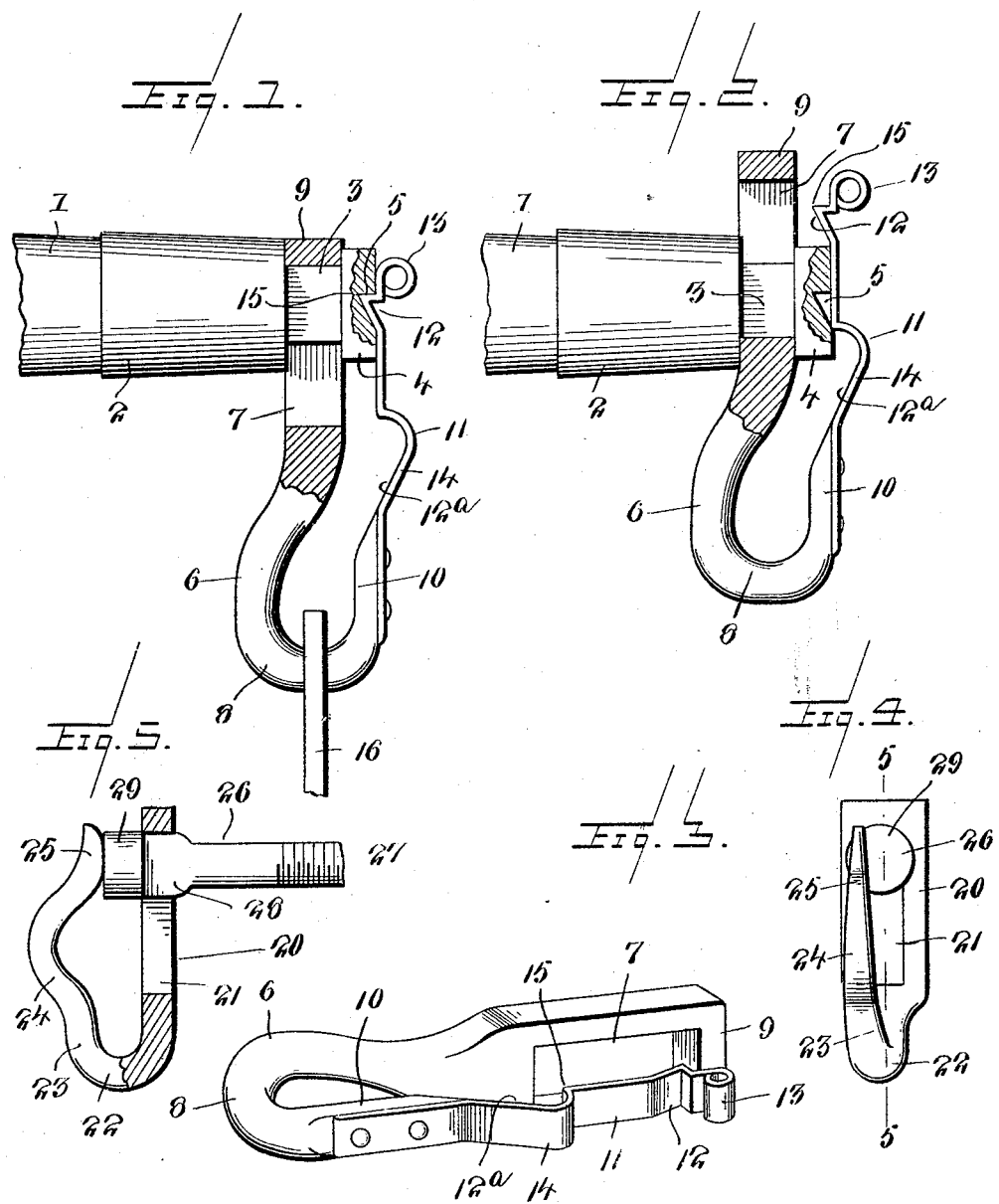

JOHN M. LEVAN, OF NUMIDIA, PENNSYLVANIA.

TRACE-HOLDER.

1,121,514.

Specification of Letters Patent.   Patented Dec. 15, 1914.

Application filed March 28, 1913. Serial No. 757,480.

*To all whom it may concern:*

Be it known that I, JOHN M. LEVAN, a citizen of the United States, residing at Numidia, in the county of Columbia and State of Pennsylvania, have invented new and useful Improvements in Trace-Holders, of which the following is a specification.

This invention relates to whiffletree hooks and more particularly to the class of safety whiffletree hooks.

The primary object of the invention is the provision of a device of this character in which a trace may be easily and quickly attached and retained against accidental displacement in a reliable manner on the hook.

With the foregoing and other objects in view, the invention consists in the details of construction and combination of parts to be hereinafter more fully set forth and claimed.

In describing the invention in detail reference will be had to the accompanying drawings forming a part of this specification wherein like characters denote corresponding parts in the several views, and in which:

Figure 1 is a cross section of a portion of a whiffletree and hook embodying the features of my invention, showing the hook in locked position; Fig. 2 is the same with the hook in open position; and Fig. 3 is a detail perspective view of the hook detached. Fig. 4 is an end view of a portion of a whiffletree, showing a slightly modified form of fastener applied thereto; and Fig. 5 is a sectional view on the plane indicated by the line 5—5 of Fig. 4.

In the drawings, 1 designates the whiffletree which has mounted thereon a sleeve or ferrule 2. The said ferrule is formed with a rectangular extension or shank 3, whose outer end is enlarged or provided with a head 4 having a recess 5 therein for a purpose to be hereinafter explained. Slidably carried by the extension 3 is a hook 6 having a relatively long opening 7 through which the extension passes, the head 4 acting as a guide for the hook in its sliding movements and preventing the slipping of the hook from the end of the ferrule. The hook is provided with an offset portion 8 permitting the trace end when in position to rest in substantially horizontal alinement with the shank 9, hence the pull of the draft animal will be a direct one causing no twisting of the hook. Extending from the tongue 10 of the hook is a clip or guard 11 of spring metal whose free end is bent inwardly to form the latch projection 12, which, when a pull is exerted upon the hook, is adapted into the keeper recess 5 thereby performing the dual function of locking the hook against any backward movement and holding the trace end against accidental displacement. It is understood that the rear wall of the opening in the shank 9 limits the forward movement of the hook, through its contact with the shank immediately on the engagement of the latch 12 in the recess 5. The free end of the clip is curved to form a closed loop 13 which affords a hand hold in freeing the clip from the ferrule in order to remove the trace end. Intermediate the ends thereof, the clip 11 is bowed, as at 14, the tendency of which is to force the point 15 of the projection beyond the outer face of the shoulder 4, thereby insuring the seating of the projection 12 in the recess 5. The lower portion of the inner face of the bow of the clip is in alinement with the inner face 12ª of the tongue 10 of the hook so as to provide therewith, one continuous surface over which the trace end may be easily and uninterruptedly adjusted to an operative position.

Assuming that the hook is in unlocked position as shown in Fig. 2, to attach the trace end 16 to the hook 6, it is necessary to slip the trace end over the clip 11 when a pull on the hook will cause the same to slide over the extension 3 and the projection 12 to become engaged in the recess 5 securely locking the trace end therein. It is obvious that to detach the trace end, the clip 11 is pulled out by means of the loop 13 until the projection 12 is freed of the recess 5 when the hook may be moved over the extension of the ferrule.

In the modified form of the invention shown in Figs. 4 and 5, the hook comprises a shank 20, which is provided with an elongated slot 21, which terminates in its forward end in an outwardly curved portion 22, as shown. From the curved portion 22, the hook is bent rearwardly at 23 and then offset at 24 and then finally provided with a retaining tongue 25. The portions 23, 24 and 25 are arranged in the same longitudinal plane and are disposed slightly to one side of the slot 21 in the shank 20. The attaching device 26 includes a threaded member 27 having a flattened portion 28, which fits between the longitudinal walls of the slot 21, whereby to permit the shank 20 to be moved in a horizontal direction. The flattened portion of the attaching device terminates in a head 29, which is disposed immediately at one side of the shank 20 and which is adapted to engage against the tongue 25 when the shank is adjusted to an operative trace holding position, as shown in full lines in Fig. 5. The forward end of the slot 21 terminates in such proximity with the offset 24 of the hook that a relatively large space will be formed between the portions 24 and 25 and the shank 20, so as to permit of the initial introduction of the trace end in the hook.

From this construction, it is evident that when it is desired to release the trace from the holder, the shank 20 is adjusted in a rearward direction, so as to cause the offset 24 of the hook to lie immediately opposite the retaining head of the attaching device. This forms the desired intervening space between the tongue of the hook and the shank, so as to permit of the free passage of the eye of the trace over the tongue and the engagement of the trace with the portion 22. When the shank 20 is drawn in a forward direction under pull of the trace, the tongue 25 engages against the head of the fastening device while the head operates as a retainer to prevent the casual displacement of the trace end from the hook, as will be understood. Through the fact that the parts 23, 24 and 25 of the hook lie to one side of the slot 21, it is seen that provision is made whereby the shank and the attaching device therefor may be initially associated with one another. In the initial operation of connecting the attaching device to the end of the whiffletree, the attaching device is first placed through the slot 21 and the head of the device is then given a slight blow with a suitable tool, so as to advance the device partly into the whiffletree. The slot 21 is then arranged, so as to receive the flattened portion of the attaching device and the shank 20 is then rotated so as to feed the attaching device in proper position in the whiffletree. In this operation, the tongue of the hook may be utilized as a manipulating means.

Having thus described my invention, what I claim is:—

1. A whiffletree, a member secured longitudinally therein and projecting from one end thereof, the projecting portion of said member being flattened and being also provided with a head at the outer side of said flattened portion, in combination with a hook having a base portion arranged across and slidable on the end of the whiffletree and provided with a slot in which the flattened portion of said member is arranged, the head of said member bearing on the outer side of said base, at opposite sides of said slot, and the said hook having a bill member provided with an outwardly extending intermediate portion and with a terminal portion arranged to move across the outer end of the head.

2. A whiffletree, a member secured longitudinally therein and projecting from one end thereof, the projecting portion of said member being flattened and being also provided with a head at the outer side of said flattened portion, in combination with a hook having a base portion arranged across and slidable on the end of the whiffletree and provided with a slot in which the flattened portion of said member is arranged, the head of said member bearing on the outer side of said base, at opposite sides of said slot, and the said hook having a bill member provided with an outwardly extending intermediate portion and which has a terminal portion arranged to move across the outer end of the head, said bill member being a spring and having a projection on its inner side and said head having a recess for engagement by said projection when the hook is arranged in trace engaging position.

In testimony whereof I affix my signature in presence of two witnesses.

JOHN M. LEVAN.

Witnesses:
L. L. DANIEL,
EARL SCHAEFFER.

Copies of this patent may be obtained for five cents each, by addressing the "Commissioner of Patents, Washington, D. C."